US012467922B2

(12) United States Patent
Jiao et al.

(10) Patent No.: US 12,467,922 B2
(45) Date of Patent: Nov. 11, 2025

(54) HYBRIDOMA CELL LINE SECRETING AN ActA MONOCLONAL ANTIBODY AND USE THEREOF

(71) Applicant: Yangzhou University, Yangzhou (CN)

(72) Inventors: Xinan Jiao, Yangzhou (CN); Yuelan Yin, Yangzhou (CN); Mengdi Zhao, Yangzhou (CN); Fanzeng Meng, Yangzhou (CN); Xiang Chen, Yangzhou (CN); Jinlin Huang, Yangzhou (CN); Zhiming Pan, Yangzhou (CN); Dan Gu, Yangzhou (CN)

(73) Assignee: Yangzhou University, Yangzhou (CN)

( * ) Notice: Subject to any disclaimer, the term of this patent is extended or adjusted under 35 U.S.C. 154(b) by 0 days.

(21) Appl. No.: 18/851,087

(22) PCT Filed: May 30, 2023

(86) PCT No.: PCT/CN2023/097071
§ 371 (c)(1),
(2) Date: Sep. 26, 2024

(87) PCT Pub. No.: WO2023/186189
PCT Pub. Date: Oct. 5, 2023

(65) Prior Publication Data
US 2025/0110125 A1    Apr. 3, 2025

(30) Foreign Application Priority Data

Apr. 1, 2022  (CN) .......................... 202210339643.3

(51) Int. Cl.
*G01N 33/569* (2006.01)
*C07K 16/12* (2006.01)
*G01N 33/58* (2006.01)

(52) U.S. Cl.
CPC .... *G01N 33/56911* (2013.01); *C07K 16/1296* (2013.01); *G01N 33/581* (2013.01);
(Continued)

(58) Field of Classification Search
CPC .... G01N 33/569; G01N 33/68; G01N 33/577; G01N 33/535; G01N 33/543;
(Continued)

(56) References Cited

FOREIGN PATENT DOCUMENTS

| CN | 104099299 A | 10/2014 |
|---|---|---|
| CN | 114574448 A | 6/2022 |
| CN | 115112881 A | 9/2022 |

OTHER PUBLICATIONS

Asano et al., Scientific Reports vol. 6, Article No. 39628 (2016). (Year: 2016).*

(Continued)

*Primary Examiner* — Jana A Hines
(74) *Attorney, Agent, or Firm* — IPRTOP LLC

(57) ABSTRACT

A hybridoma cell line secreting an ActA monoclonal antibody and a use thereof. The hybridoma cell line was deposited on Jul. 8, 2021, at the China Center for Type Culture Collection (CCTCC) with the depository accession number of CCTCC NO: C2021174. The present invention also discloses the ActA monoclonal antibody secreted by this hybridoma cell line or its progeny cell line, a detection kit containing this ActA monoclonal antibody, immunomagnetic beads, the preparation method and use of immunomagnetic beads, and competitive ELISA and indirect ELISA detection methods. The ActA monoclonal antibody of the present invention has the advantages of high titer, good specificity, and strong affinity with the natural antigen. The *Listeria* competitive ELISA detection kit and immunomagnetic beads developed based on this antibody have high sensitivity and good stability, effectively monitoring the (Continued)

level of ActA antibodies in clinical serum samples, and can be used for labeling *Listeria monocytogenes*.

5 Claims, 6 Drawing Sheets

Specification includes a Sequence Listing.

(52) U.S. Cl.
CPC .... *C07K 2317/94* (2013.01); *G01N 2333/195* (2013.01); *G01N 2333/908* (2013.01); *G01N 2469/10* (2013.01); *G01N 2470/10* (2021.08)

(58) Field of Classification Search
CPC ....... G01N 33/56911; G01N 33/54326; G01N 33/54306; C07K 16/1296; Y02A 50/30
See application file for complete search history.

(56) References Cited

OTHER PUBLICATIONS

Cui et al., (China Animal Husbandry & Veterinary Medicine. 2010. vol. 37, Issue (3):71-74). (Year: 2010).*
Niebuhr et al., (Infection and Immunity. Jul. 1993, vol. 61, No. 7, p. 2793-2802). (Year: 1993).*
Genbank, "Clonal Evolution of Autoreactive Germinal Centers", GenBank: ASW22198.1, Sep. 5, 2017 (Sep. 5, 2017), US.
Søren E. Degn et al.,Preparation of Monoclonal Antibodies Against ActA of Listeria Monocytogenes, Progress in Veterinary Medicine), vol. {0} 31, No. {0} 5, May 20, 2010 (May 20, 2010), CN.

* cited by examiner

HYBRIDOMA CELL LINE SECRETING AN ActA MONOCLONAL ANTIBODY AND USE THEREOF

FIELD OF THE INVENTION

The present invention relates to a hybridoma cell line secreting an ActA monoclonal antibody and a use thereof, and belongs to the technical field of bioassay.

BACKGROUND OF THE INVENTION

*Listeria monocytogenes*, also known as Lm, is a key foodborne zoonotic pathogen with a broad host range, capable of causing listeriosis in both humans and animals. Upon infection, *Listeria monocytogenes* can inflict substantial economic damage to livestock farms. *Listeria monocytogenes* carried by animals can enter the food supply chain through slaughter and processing stages. As these infected animal products undergo processing, transportation, and sales, they eventually reach the consumer's table, leading to potential human infections with a mortality rate as high as 30%, thereby posing a severe threat to human health.

Strengthening the screening for listeriosis in animal farming stages helps identify infections at an early stage and implement corresponding prevention and control measures, thereby preventing diseased livestock from entering the food supply chain, which is of great importance for public health safety. Traditional methods of pathogen isolation and culture are time-consuming and cannot meet the need for rapid detection, and they can only detect the bacteria at specific stages of animal infections. Currently, serological methods are commonly used for detecting listeriosis, and utilize known bacteria or bacterial antigens to detect the presence of corresponding antibodies in body fluids, thereby diagnosing infectious diseases. ActA is a crucial virulence factor of *Listeria monocytogenes*, located on the cell wall surface, and has been confirmed to have strong immunogenicity. Using the surface protein ActA of *Listeria monocytogenes* as a detection antigen to establish a competitive ELISA assay is significant for the effective prevention and control of listeriosis.

Traditional bacterial isolation and culture is the gold standard for detecting *Listeria monocytogenes*, but this technique is time-consuming and cannot meet the requirements for rapid detection. Pathogenic detection methods based on nucleic acids are less time-consuming and more sensitive, but they are easily influenced by various factors such as sample type, template, and primers, and have high requirements for equipment. Immunological detection methods based on antigens and antibodies compensate well for the shortcomings of traditional detection methods and molecular biology methods, and are widely used in the detection and control of foodborne diseases. Immunomagnetic beads technology (IMBS) is widely studied for its high specificity and good stability of solid-phase reagents. Therefore, how to rapidly and specifically detect *Listeria monocytogenes* in food is still challenging.

SUMMARY OF THE INVENTION

The present invention provides a hybridoma cell line.

The present invention provides an ActA monoclonal antibody secreted by the hybridoma cell line or its progeny cell line.

The present invention provides a polynucleotide encoding the ActA monoclonal antibody.

The present invention provides a use of the ActA monoclonal antibody and the polynucleotide in the preparation of a reagent or a kit for detecting *Listeria monocytogenes*.

The present invention provides a competitive ELISA detection kit for detecting *Listeria monocytogenes* infection.

The present invention provides an immunomagnetic bead for detecting *Listeria monocytogenes*, and a preparation method and use thereof.

The present invention provides a kit containing the immunomagnetic bead or made from the immunomagnetic bead.

The present invention provides a hybridoma cell line, 3G11, that secretes antibodies against *Listeria monocytogenes*. This cell line was deposited on Jul. 8, 2021, at the China Center for Type Culture Collection (CCTCC), located at Wuhan University, China, with the depository accession number of CCTCC NO: C2021174 and the classification name of Hybridoma Cell Line 3G11. The present invention also provides an ActA monoclonal antibody, which is secreted by the aforementioned hybridoma cell line 3G11 or subclones thereof.

The ActA monoclonal antibody comprises a heavy chain and a light chain.

The light chain comprises three complementarity determining regions, and the amino acid sequences of the three complementarity determining regions of the light chain are shown as SEQ ID NO. 1, SEQ ID NO. 2, and SEQ ID NO. 3, respectively.

The heavy chain comprises three complementarity determining regions, and the amino acid sequences of the three complementarity determining regions of the heavy chain are shown as SEQ ID NO.4, SEQ ID NO.5, and SEQ ID NO.6, respectively. The full-length amino acid sequence of the light chain is shown as SEQ ID NO.7.

The full-length amino acid sequence of the heavy chain is shown as SEQ ID NO.9.

The present invention also provides a polynucleotide, wherein the polynucleotide encodes the ActA monoclonal antibody.

The nucleotide sequence of the polynucleotide encoding the light chain is shown as SEQ ID NO.8.

The nucleotide sequence of the polynucleotide encoding the heavy chain is shown as SEQ ID NO.10.

The present invention also provides a use of the ActA monoclonal antibody and the polynucleotide in the preparation for detecting *Listeria monocytogenes*.

The present invention also provides a competitive ELISA assay kit for detecting *Listeria monocytogenes*, wherein the kit comprises the ActA monoclonal antibody or the polynucleotide.

The kit further comprises a positive control and a negative control. The positive control is *Listeria monocytogenes* positive serum and the negative control is *Listeria monocytogenes* negative serum.

The kit further comprises a coating antigen (i.e., ActA antigen), coating buffer, blocking buffer, dilution buffer, washing buffer, substrate solution, and reaction stop solution.

The present invention also provides a competitive ELISA assay for detecting *Listeria monocytogenes*, wherein the method comprises the following steps:
  (1) diluting the test antigen with the coating buffer, washing the test antigen with PBST, performing blocking and washing;
  (2) adding the *Listeria monocytogenes* positive serum and the *Listeria monocytogenes* negative serum, both diluted with dilution buffer, to the test antigen from step (1), and performing incubation;

(3) adding the HRP-labeled antibody against the bacterial surface protein that is diluted with dilution buffer, and performing incubation and washing;

(4) adding the substrate solution, stopping the reaction with the reaction stop solution after color development, measuring the absorbance, and analyzing the results.

The coating buffer is carbonate buffer with a pH of 9.6.

The washing buffer is a PBST solution with a pH of 7.2.

The blocking buffer is a PBS solution containing 2-5% non-fat dry milk.

The dilution buffer is a PBS solution containing 1-2% BSA.

The reaction stop solution is a 0.5-2 mol/L $H_2SO_4$ solution.

The present invention also provides an indirect ELISA assay for fluorescently labeling *Listeria monocytogenes*, comprising the following steps:

(1) pre-adding glass slices to a 24-well plate, mixing the cell line or primary cells with *Listeria monocytogenes* solution at an MOI of 20:1 to obtain a mixture solution, adding 1 mL of the mixture solution to each well, and incubating at 37° C. for 7-8 hours.

(2) performing washing, adding 400 μL of blocking buffer to each well, incubating at 37° C. for 2-3 h;

(3) adding 400 μL of ActA monoclonal antibody solution that is diluted by dilution buffer to each well, and performing incubation and washing;

(4) adding 400 μL of Goat Anti-Mouse IgG (Alexa Flour488) that is diluted by dilution buffer to each well, and performing incubation and washing;

(5) adding 400 μL of phalloidin that is diluted by dilution buffer to each well, and performing incubation and washing;

(6) adding 400 μL of DAPI that is diluted by dilution buffer to each well, and performing incubation and washing;

(7) gently removing the glass slices from the 24-well plate with tweezers, mounting the glass slices with 50% glycerol, and observing under a laser confocal microscope.

The washing buffer is a PBS solution with a pH of 7.2.

The blocking buffer is a PBS solution containing 2-5% BSA.

The dilution buffer is a PBS solution containing 2-5% BSA.

In step (3), the ActA monoclonal antibody is diluted at a ratio of 1:100 in volume, the incubation temperature is 37° C., and the incubation time is 2-3 h.

In step (4), the Goat Anti-Mouse IgG (Alexa Flour488) is diluted at a ratio of 1:200 in volume, the incubation temperature is 37° C., and the incubation time is 2-3 h.

In step (5), the phalloidin is diluted at a ratio of 1:1000 in volume, the incubation temperature is 37° C., and the incubation time is 1-2 h.

In step (6), DAPI is diluted at a ratio of 1:100,000 in volume, the incubation temperature is 37° C., and the incubation time is 15-30 min.

The present invention also provides an immunomagnetic bead, wherein the immunomagnetic bead is prepared by covalently coupling the ActA monoclonal antibody with an activated carboxyl magnetic bead.

The present invention also provides a method for preparing the immunomagnetic bead, wherein the method comprises the following steps:

(1) activation of the carboxyl magnetic bead: mixing the carboxyl magnetic bead with a MEST solution, performing sedimentation separation, discarding the supernatant, resuspending the bead in MEST solution, resuspending the carboxyl magnetic bead in MEST solution after washing to obtain magnetic bead suspension, adding activation reagent to the magnetic bead suspension, and mixing and shaking, to obtain the activated carboxyl magnetic bead solution;

(2) coupling of the antibody: mixing the ActA monoclonal antibody with the activated carboxyl magnetic bead solution, adjusting the total volume with the MEST solution, mixing and incubating for the coupling to obtain the immunomagnetic bead.

In step (1), the MEST solution is a MES solution containing 0.05% Tween-20, with a pH of 6.0.

The MES solution has a concentration of 0.01 mol/L and a pH of 6.0.

In step (1), the activation reagent is a MEST solution containing EDC and NHS.

In step (1), the temperature during the shaking is 37° C., and the time of the shaking is 1 h.

In step (2), the incubation time for the coupling is 3-5 h.

The present invention further provides a use of the immunomagnetic bead in the preparation of a reagent or a kit for detecting *Listeria monocytogenes*.

The present invention further provides a kit for detecting *Listeria monocytogenes*, wherein the kit comprises the immunomagnetic bead.

The mechanism of the ELISA assay process in the present invention is as follows. The foundation of ELISA is the solid-phase immobilization of antigens or antibodies and the enzyme labeling of antigens or antibodies.

Antigens or antibodies bound to the solid-phase carrier surface retain their immunological activity, and enzyme-labeled antigens or antibodies retain both their immunological activity and enzyme activity. During the assay, the specimen (which contains the antibody or antigen to be tested) reacts with the antigen or antibody on the solid-phase carrier surface. After washing, the antigen-antibody complexes formed on the solid-phase carrier are separated from other substances in the liquid. Enzyme-labeled antigens or antibodies are then added, which also bind to the solid-phase carrier through reactions. The amount of enzyme on the solid phase carrier is proportional to the amount of the substance to be tested in the specimen. After adding the substrate for the enzyme reaction, the substrate is catalyzed by the enzyme into a colored product. The amount of product is directly related to the amount of the substance to be tested in the specimen, allowing for qualitative or quantitative analysis based on the color intensity.

Immunomagnetic bead technology is used in the present invention to rapidly capture and enrich *Listeria monocytogenes*. The specificity of the immunomagnetic beads is determined by the immunoactive substances coated on the magnetic beads. After the magnetic particles capture the bacteria, qualitative results can be directly obtained using chemiluminescence methods. The immunomagnetic bead technology can also be combined with molecular detection techniques. Additionally, the regenerability of the magnetic beads reduces detection costs. These characteristics make this technology widely applicable to detection organizations and enterprises. Reagents or kits based on this technology can be further developed, which are cost-effective and efficient, meeting the needs of basic units. Therefore, this technology has a good application prospect and the potential to bring considerable economic benefits. The immunomagnetic bead method for capturing *Listeria monocytogenes* in food eliminates the need for pure culture enrichment required by traditional detection techniques, significantly shortening detection time. Besides, it forms an integrated detection system encompassing the fields of biology and immunology.

According to the above description, the present invention has the following significant advantages:

(1) The monoclonal antibody secreted by the hybridoma cell line provided in the present invention has the advantages of high titer, good specificity, and strong affinity for natural antigens. The competitive ELISA assay and kit for Listeriosis based on this antibody exhibit high sensitivity and stability, with no cross-reactivity with other pathogens. Therefore, the present invention provides a sensitive and rapid detection method for *Listeria monocytogenes*, offering an important tool for the prevention and control of listeriosis.

(2) The competitive ELISA assay described in the present invention can realize the detection at all stages of *Listeria monocytogenes* infection, and the results can be interpreted using a simple standard curve, providing a basis for the quantification of *Listeria monocytogenes*. Compared to other ELISA assays, the competitive ELISA assay has a shorter operation time and a more efficient experimental workflow. Additionally, the competitive ELISA assay can quantify antibody concentrations, making it more advantageous for detecting low concentrations of antibodies.

(3) The monoclonal antibody contained in the immunomagnetic bead provided by the present invention has the advantages of high specificity, high affinity, and strong affinity for natural antigens. The immunomagnetic bead method for detecting *Listeria monocytogenes* established based on this antibody has good stability and no cross-reactivity with other pathogens. The present invention covalently couples the specific antibody of *Listeria monocytogenes* with the carboxyl magnetic beads, coating the specific antibody on the surface of the magnetic particles to prepare the immunomagnetic beads. The present invention allows for the rapid and efficient enrichment of *Listeria monocytogenes*, avoiding the drawbacks of traditional pre-enrichment processes, as well as has the advantages of being time-saving, easy to operate, and highly specific. Additionally, under the influence of a magnetic field, the enrichment and separation needed for subsequent detection can be achieved. The present invention makes the rapid detection of *Listeria monocytogenes* possible and introduces a new idea for the detection of various pathogens. Based on the immunomagnetic bead prepared from the monoclonal antibody of *Listeria monocytogenes*, a complete immunomagnetic capture system is further established, with a minimum capture time of only 15 minutes, enabling rapid enrichment of *Listeria monocytogenes* in a short time, and offering a novel and effective enrichment method for the detection of pathogenic bacteria. The experimental operation is simple and does not require professional technical personnel.

(4) The detection method of the present invention is highly specific, with a sensitivity over $10^2$-$10^3$ CFU/mL for detecting *Listeria monocytogenes* in pure cultures.

This method significantly shortens the detection time for *Listeria monocytogenes*, and when combined with appropriate other detection methods, it can achieve rapid enrichment of *Listeria monocytogenes* with high specificity.

DETAILED DESCRIPTION OF THE INVENTION

Figure 1:
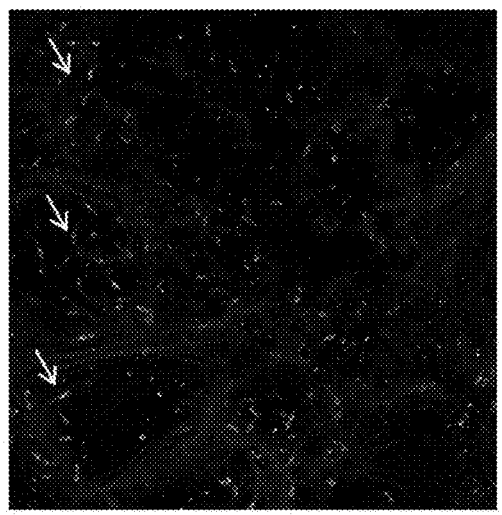
FIG. 1 shows laser confocal microscopy results of ActA monoclonal antibody.

The technical solution of the present invention is further described below in conjunction with the accompanying drawings. Unless otherwise indicated, the reagents, methods, and apparatus employed in the present invention are conventional reagents, methods, and apparatus in the art.

1. Strains and Antibodies:

*Listeria monocytogenes, Salmonella typhimurium, Staphylococcus aureus, Escherichia coli*, and *Vibrio parahaemolyticus* are all preserved in our laboratory. The monoclonal antibody against *Listeria monocytogenes* is prepared by our laboratory.

2. Main Reagents and Instruments

Carboxylated magnetic beads (PM3-020) were purchased from Shanghai Allrun Nano Science & Technology Co., Ltd; carbodiimide (EDC) was purchased from Shanghai Yuanye Bio-Technology Co., Ltd.; N-hydroxysuccinimide (NHS) was purchased from Shanghai Jiachen Chemical Co., Ltd.; UVM modified *Listeria* enrichment medium, Fraser base medium, brain heart infusion (BHI) medium, and buffered peptone water were purchased from BD Company; *Listeria* chromogenic medium was purchased from CHROMagar Company in France; multifunctional magnetic separator was purchased from Shanghai Allrun Nano Material Technology Co., Ltd.

Example 1: Acquisition of ActA Monoclonal Antibody 3G11

1. Animal Immunization

The specific immunization steps are as follows: 8-week-old female BALB/c mice were immunized with purified His-tagged ActA protein, namely rHis-ActA protein. For the first immunization, rHis-ActA protein was mixed with Freund's complete adjuvant at a volume ratio of 1:1, thoroughly emulsified, and administered via intraperitoneal injection at a dose of 50 μg per mouse. Fourteen days later, the second immunization was conducted using Freund's incomplete adjuvant instead of Freund's complete adjuvant, with the remaining steps identical to the first immunization. Seven days after the second immunization, mouse serum was collected, and the antibody titer of ActA in the serum was detected by indirect ELISA. The mice with the highest antibody level were selected for a booster immunization. Fourteen days after the second immunization, the booster immunization was conducted by intraperitoneally injecting rHis-ActA protein into the mice with the highest antibody level at a dose of 100 μg per mouse. Three days after the booster immunization, spleen lymphocytes were collected from the mice for cell fusion.

The rHis-ActA protein was sourced from freshly cultured recombinant E. coli BL21(DE3) (pET-actA), which was inoculated at a 1:50 ratio into LB liquid medium containing kanamycin, and shaken at 37° C. until the OD value reached 0.4; then 0.1 mM/L protein inducer (IPTG) was added, and the culture was incubated at 37° C. for 6 hours. The bacterial cells were collected by centrifugation, washed with sterile PBS, and resuspended. The bacterial cells were lysed in an ice bath using an ultrasonic cell disruptor (800 W, 10 seconds for each ultrasonication, 20 seconds for each interval). The lysate was centrifuged, and the supernatant was collected and added to an affinity chromatography column (His-Bind purification kit, purchased from Novagen) pre-washed with 20 mL of sterile pure water. Binding buffer (20 mL), washing buffer (12 mL), and elution buffer (12 mL) were sequentially added, and the purified product rHis-ActA was collected in a sterile finger-shaped tube. The binding buffer, washing buffer, and elution buffer were all included in the His-Bind purification kit.

2. Cell Fusion

The specific steps are as follows: on the third day after the booster immunization in Example 1, the immunized mice were euthanized following biosafety procedures. The mice were soaked in 75% ethanol for 5 minutes for disinfection, and spleen cells were aseptically collected and fused with log-phase myeloma cells SP2/0 by using PEG (MW1450). Peritoneal macrophages from ICR mice (purchased from the Comparative Medicine Center of Yangzhou University) were used as feeder cells. The fused cells and feeder cells were suspended in HAT medium, dispensed into a 96-well plate, and cultured in a 37° C., 5% CO2 incubator. Fresh HAT medium was added after 5 days, and HT medium was used after 10 days. On a regular basis, the cultures were observed, media were changed, and assays were performed.

3. Establishment of Indirect ELISA Detection Assay

The indirect ELISA assay was used to screen positive cell clones, and the optimal coating buffer concentration for the detection antigen rGST-ActA was determined by matrix test. The detection antigen rGST-ActA was diluted in a horizontal gradient with coating buffer, and the diluted detection antigen rGST-ActA was added, with 100 μL per well, to coat the ELISA plate overnight at 4° C. The plate was washed three times with PBST, and 300 μL of PBS containing 2% BSA was added to each well as a blocking buffer, and incubated overnight at 4° C. The immune mouse serum was serially diluted 1:100, 1:200, 1:400, 1:800, 1:1000, and 1:2000 with blocking buffer, which was then added to the plate at 100 μL per well. Serum from SPF mice diluted similarly was used as a negative control. The plate was incubated at 37° C. for 2 hours. After washing three times with PBST, HRP-labeled goat anti-mouse IgG antibody diluted 1:5000 with blocking buffer was added to the plate at 100 μL per well, and the plate was incubated at 37° C. for 1 hour. After washing, 100 μL of TMB substrate was added to each well for color development for 5 minutes. The reaction was stopped by adding 50 μL of 2M $H_2SO_4$, and the absorbance at 450 nm was measured using a microplate reader. The optimal conditions were determined when the negative serum has its maximum $OD_{450}$ value and the positive serum has an $OD_{450}$ value around 1.0.

The source of rGST-ActA is as follows: freshly cultured recombinant E. coli BL21 (pGEX-6p-1-actA) was inoculated at a ratio of 1:50 into LB liquid medium containing ampicillin, shaken at 37° C. until the OD value reached 0.4, and induced with 0.2 mM/L IPTG at 30° C. for 5 hours. The bacterial cells were collected by centrifugation, washed with sterile PBS, and resuspended. The cells were lysed in an ice bath using an ultrasonic cell disruptor (800 W, 10 seconds for each ultrasonication, 20 seconds for each interval). The lysate was centrifuged, and the supernatant was collected and added to a Sepharose 4B column pre-washed with 10 mL of pre-cooled PBS. The column was equilibrated with pre-cooled PBS, and 2 mL of elution buffer was added. The purified product rGST-ActA was collected in a sterile fingure-shaped tube (refer to the Redipack GST purification moduce steps, purchased from Amersham Bioscience).

4. Screening Positive Clones

The established indirect ELISA assay was used to detect antibodies secreted by hybridoma cells. The specific method is as follows: the culture supernatant of hybridoma cells was added to a pre-coated ELISA plate, at 100 μL per well. SP2/0 cell supernatant was used as a negative control, and immune mouse polyclonal serum as a positive control. The plate was incubated in a 37° C. water bath for 2 hours and washed three times with PBST. HRP-labeled goat anti-mouse IgG antibody diluted 1:5000 with blocking buffer was added to the plate, at 100 μL per well, and incubated in a 37° C. water bath for 1 hour. After washing, TMB substrate was added for color development for 5 minutes, and the absorbance at 450 nm was read. Wells with $OD_{450}$ readings more than twice the negative control were considered positive. One positive clone was named positive cell clone 3G11. This positive cell clone 3G11 was deposited on Jul. 8, 2021, at the China Center for Type Culture Collection (CCTCC), located at Wuhan University, China, with the depository accession number of CCTCC NO: C2021174, and the classification name of Hybridoma Cell Line 3G11.

5. Cloning Positive Hybridoma Cells

The positive cell clone 3G11 was diluted by the limiting dilution method, then subcloned three times, and preserved. The positive cell clone 3G11 corresponds to the hybridoma cell line with the depository accession number of C2021174.

Example 2: Preparation of ActA Monoclonal Antibody Against Listeria monocytogenes 1. Preparation of Ascites Ten-week-old female BALB/c mice were selected for the preparation of ascites. Liquid paraffin was used as the inducer and injected intraperitoneally into the mice at a dose of 500 μL per mouse. One week later, each mouse was injected with $5\times10^5$ hybridoma cells. When the mice's abdomens became visibly distended, the ascites fluid was collected. The collected ascites fluid was centrifuged at room temperature to remove precipitates, and the supernatant was collected and stored at −70° C. The monoclonal antibody secreted by the hybridoma cell line with the depository accession number of C2021174 or its progeny cell line (corresponding to hybridoma cell 3G11) was designated as monoclonal antibody 3G11.

2. Determination of Ascites Titer

The ascites fluid containing 3G11 monoclonal antibody was diluted with blocking buffer at serial ratios of 1:1000, 1:2000, 1:4000, 1:8000, 1:16000, 1:32000, 1:64000, 1:128000, 1:256000, 1:512000, 1:1024000, and 1:2048000, and was added to an ELISA plate coated with detection antigen rGST-ActA at 100 μL per well. Ascites fluid containing SP2/0 cells, diluted at the same ratios, was used as a negative control. The plate was incubated at 37° C. for 2 hours and then washed three times with PBST. A working solution of HRP-labeled goat anti-mouse IgG antibody, diluted 1:5000 with blocking buffer, was added to the plate at 100 μL per well and incubated at 37° C. for 1 hour. After washing with PBST, TMB substrate was added for color development. After stopping the reaction, the absorbance at 450 nm was read and the results were analyzed. The titer of the monoclonal antibody ascites was determined using a P/N value ≥2.1 as the criterion. The results showed that the titer of monoclonal antibody 3G11 ascites reached 1×10⁵.

3. Purification and Labeling of the Monoclonal Antibody

The prepared monoclonal antibody 3G11 ascites fluid was purified using the Protein G affinity chromatography method. The purified 3G11 monoclonal antibody was then labeled with horseradish peroxidase (this step was completed at GenScript, Nanjing).

4. Sequencing of *Listeria monocytogenes* Monoclonal Antibody

After identification, the results showed that the amino acid sequence of the complementarity determining region 1 (CDR1) of the light chain of monoclonal antibody 3G11 was shown as SEQ ID NO.1, and specifically was RSSQSLVHSNGNTYLH.

The amino acid sequence of the complementarity determining region 2 (CDR2) of the light chain of monoclonal antibody 3G11 was shown as SEQ ID NO.2, and specifically was RVSNRFS.

The amino acid sequence of the complementarity determining region 3 (CDR3) of the light chain of monoclonal antibody 3G11 was shown as SEQ ID NO.3, and specifically was SQSTHVPYT.

The amino acid sequence of the complementarity determining region 1 (CDR1) of the heavy chain of monoclonal antibody 3G11 was shown as SEQ ID NO.4, and specifically was NYWIG.

The amino acid sequence of the complementarity determining region 2 (CDR2) of the heavy chain of monoclonal antibody 3G11 was shown as SEQ ID NO.5, and specifically was DIYPGTGYTNYNEKFKG.

The amino acid sequence of the complementarity determining region 3 (CDR3) of the heavy chain of monoclonal antibody 3G11 was shown as SEQ ID NO.6, and specifically was DLDY.

The full-length amino acid sequence of the light chain was shown as SEQ ID NO. 7, and specifically was

MKLPVRLLVLMFWIPASSSDVVMTQTPLSLPVSLGNQASISCRSSQSLVH

SNGNTYLHWYLQKPGQSPKLLIYRVSNRFSGVPDRFSGSGSGTDFTLKIS

RVEAEDLGVYFCSQSTHVPYTFGGGTKLEIK.

The nucleotide sequence encoding the light chain was shown as SEQ ID NO. 8, and specifically was

ATGAAGTTGCCTGTTAGGCTGTTGGTGCTGATGTTCTGGATTCCTGCTTC

CAGCAGTGATGTTGTGATGACCCAAACTCCACTCTCCCTGCCTGTCAGTC

TTGGAAATCAAGCCTCCATCTCTTGCAGATCTAGTCAGAGCCTTGTACAC

AGTAATGGAAACACCTATTTACATTGGTACCTGCAGAAGCCAGGCCAGTC

TCCAAAGCTCCTGATCTACAGAGTTTCCAACCGATTTTCTGGGGTCCCAG

ACAGGTTCAGTGGCAGTGGATCAGGGACAGATTTCACACTCAAGATCAGC

AGAGTGGAGGCTGAGGATCTGGGAGTTTATTTCTGCTCTCAAAGTACACA

TGTTCCGTACACGTTCGGAGGG GGGACCAAGCTGGAAATAAAA.

The full-length amino acid sequence of the heavy chain was shown as SEQ ID NO. 9, and specifically was

MEWSGVFIFLLSVTAGVHSQVQLQQSGADLVRPGTSVKMSCKAAGYTFTN

YWIGWVKQRPGHGLEWIGDIYPGTGYTNYNEKFKGKATLTADTSSSTAYM

QLSSLTSEDSAIYYCARDLDYWGQGTSVTVSS.

The nucleotide sequence encoding the heavy chain was shown as SEQ ID NO. 10, and specifically was

ATGGAATGGAGCGGGGTCTTTATCTTTCTCCTGTCAGTAACTGCAGGTGT

CCACTCCCAGGTCCAGCTGCAGCAGTCTGGAGCTGACCTGGTAAGGCCTG

GGACTTCAGTGAAGATGTCCTGCAAGGCTGCGGGATACACCTTCACTAAC

TACTGGATAGGTTGGGTAAAGCAGAGGCCTGGACATGGCCTTGAGTGGAT

TGGAGATATTTATCCTGGAACTGGTTATACTAACTACAATGAGAAGTTCA

AGGGCAAGGCCACACTGACTGCAGACACATCCTCCAGCACAGCCTACATG

CAGCTCAGCAGCCTGACATCTGAGGACTCTGCCATCTATTACTGTGCAAG

AGACTTGGACTACTGGGGTCAA GGAACCTCAGTCACCGTCTCCTCA.

Example 3: Specific Binding of ActA Monoclonal Antibody to *Listeria monocytogenes* Surface Protein ActA 1. Laser Confocal Observation Based on ActA Monoclonal Antibody Labeling *Listeria*

(1) The ability of ActA monoclonal antibody to bind to the surface ActA antigen of *Listeria monocytogenes* was further determined using laser confocal microscopy. The steps were as follows: glass slices were pre-added to a 24-well plate. Caco-2 cells and *Listeria monocytogenes* solution were mixed at a MOI of 20:1 to obtain a mixture, and 1 mL of the mixture was added to each well. After incubating at 37° C. for 7-8 hours, the plate was washed twice with 10 mM PBS solution (pH 7.2).

(2) 400 μL of 4% paraformaldehyde was added to each well and fixed for 20 minutes. After washing twice with PBS, 400 μL of 0.5% tritox-100 solution was added to each well and permeabilized at 37° C. in a water bath for 20 minutes. The plate was washed three times with 10 mM PBS solution (pH 7.2).

(3) 400 μL of PBS solution containing 2-5% BSA was added to each well and blocked at 37° C. for 2-3 hours.

(4) 400 μL of ActA monoclonal antibody solution diluted 1:100 with PBS solution containing 2-5% BSA was added to each well. After incubating at 37° C. for 2-3 hours, the plate was washed five times with 10 mM PBS solution (pH 7.2).

(5) 400 μL of Goat Anti-Mouse IgG (Alexa Fluor 488) solution diluted 1:200 with PBS solution containing 2-5% BSA was added to each well. After incubating at 37° C. for 2-3 hours, the plate was washed five times with 10 mM PBS solution (pH 7.2).

(6) 400 μL of phalloidin solution diluted 1:1000 with PBS solution containing 2-5% BSA was added to each well. After incubating at 37° C. for 1-2 hours, the plate was washed five times with 10 mM PBS solution (pH 7.2).

(7) 400 μL of DAPI solution diluted 1:100,000 with PBS solution containing 2-5% BSA was added to each well. After incubating at 37° C. for 15-30 minutes, the plate was washed five times with 10 mM PBS solution (pH 7.2).

(8) The glass slices from the 24-well plate were gently removed with tweezers and mounted with 50% glycerol. Laser confocal observation was then performed, and the results are shown in FIG. 1.

FIG. 1 shows laser confocal observation results of ActA monoclonal antibody. As shown in FIG. 1, *Listeria monocytogenes* entered the host cells, escaped host autophagy, and utilized host actin aggregation to form comet tails, facilitating intracellular movement and intercellular spread. This process of aggregating host actin requires the involvement of the *Listeria* surface antigen ActA. This example used ActA monoclonal antibody and Goat Anti-Mouse Alexa Fluor 488 to visualize ActA. Actin cytoskeleton was stained red by phalloidin, and nuclei were stained blue by DAPI after fixation and permeabilization. The results indicated a strong binding ability of ActA monoclonal antibody to the ActA antigen expressed on the cell wall of intracellular *Listeria*.

Example 4: Establishment of ActA Monoclonal Antibody Competitive ELISA Assay

1. Determination of the Working Concentrations of Coated Antigen and Enzyme-Labeled Antibody The matrix titration method was used. The detection antigen rHis-ActA was diluted with coating buffer (0.05 mol/L carbonate buffer, pH 9.6) to final concentrations of 3.0, 2.0, and 1.0 μg/mL. The diluted antigen solution was added with 100 μL per well and incubated at 4° C. overnight. The wells were then washed three times with washing buffer (PBST solution, pH 7.2) for 5 minutes each time. Each well was added with 300 μL of PBS solution containing 2% BSA for blocking at 37° C. for 3 hours. After blocking, the wells were washed three times with a washing buffer for 5 minutes each time. Serum samples were diluted 1:10 with PBS solution containing 2% BSA. The enzyme-labeled antibody, HRP-ActA monoclonal antibody, was diluted with PBS solution containing 2% BSA at ratios of 1:16000, 1:20000, 1:24000, 1:28000, and 1:32000. The diluted serum samples and enzyme-labeled antibody were added to the ELISA plates simultaneously, at 50 μL per well, mixed on a shaker at room temperature for 5 minutes, and then incubated at 37° C. for 2 hours. The wells were washed seven times with washing buffer for 5 minutes each time. 100 μL of TMB substrate solution was added to each well and incubated at 37° C. in the dark for 5 minutes. The reaction was stopped by adding 50 μL of stop solution (2 mol/L $H_2SO_4$) to each well. The absorbance at 450 nm ($OD_{450}$) was measured using a microplate reader. A blank control (containing only the detection antigen and enzyme-labeled antibody without serum) was also set up. The serum inhibition rate (PI) was calculated using the formula: Inhibition rate=(1-$OD_{450}$ of test serum/$OD_{450}$ of blank control)×100%. The optimal working concentrations of the antigen and enzyme-labeled antibody were determined by selecting the antigen concentration and antibody dilution with the highest P/N ratio (P is the positive control inhibition rate, and N is the negative control inhibition rate), the least antigen and enzyme-labeled antibody usage, and the lowest negative inhibition rate. The best coating antigen concentration was found to be 2.0 μg/mL, and the optimal dilution of the enzyme-labeled antibody was found to be 1:32000.

2. Determination of Serum Dilution

Figure 2:
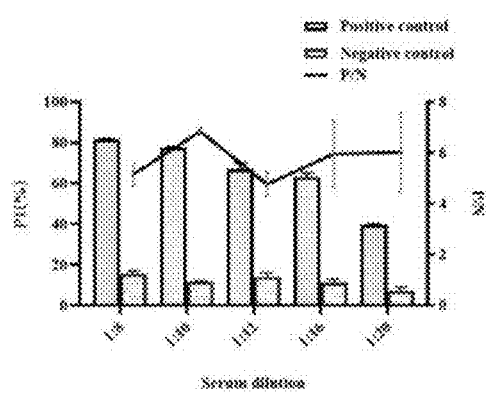
FIG. 2 shows an effect of different serum dilutions on inhibition rate and P/N value in competitive ELISA.

The ELISA plate was coated with the antigen at an optimal concentration of 2.0 μg/mL, incubated overnight at 4° C., and then washed with PBST solution (pH 7.2). Each well was added with 300 μL of blocking buffer (PBS solution containing 2% BSA) and incubated at 37° C. for 3 hours. After washing, serum samples diluted at ratios of 1:8, 1:10, 1:12, 1:16, and 1:20 were mixed with the HRP-ActA enzyme-labeled antibody (with an optimal concentration of 1:32000) at a ratio of 1:1, 100 μL of which mixture is added to each well (two parallel groups was set for each ratio of serum samples). The plate was incubated at 37° C. for 2 hours. After washing, TMB substrate solution was added for color development, incubated at 37° C. in the dark for 3 minutes, and then 2M $H_2SO_4$ stop solution was added. The absorbance at 450 nm ($OD_{450}$ nm) was read. The P/N values were calculated and compared with each other, and the trends in inhibition rates of the negative and positive controls were observed, in order to select the appropriate serum dilution. The results are shown in FIG. 2. FIG. 2 shows the effect of different serum dilutions on inhibition rate and P/N value in competitive ELISA. From FIG. 2, it can be seen that the 1:10 serum dilution provided the highest P/N value, making it the optimal dilution to ensure the sensitivity of the method.

3. Determination of Coating Conditions

Figure 3:
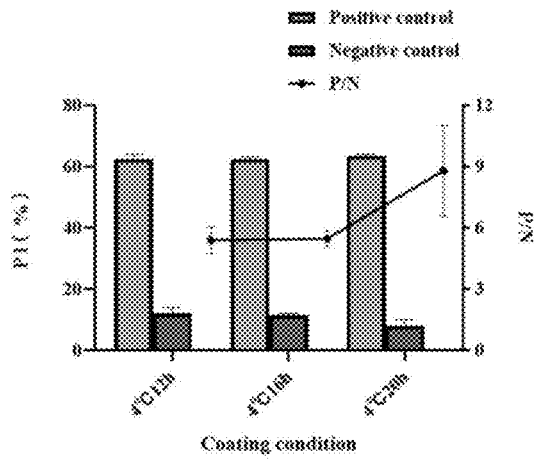
FIG. 3 shows an effect of different coating temperatures and durations of time on inhibition rate and P/N value.

Except for a detection antigen concentration of 2 μg/mL, an enzyme-labeled antibody dilution of 1:32000, and a serum dilution of 1:10, the remaining experiment steps and parameters were the same as those in 2 Determination of serum dilution. Three sets of coating conditions were established: Group 1 at 4° C. for 12 hours, Group 2 at 4° C. for 16 hours, and Group 3 at 4° C. for 20 hours, with all other operations unchanged. The PI and P/N values of each group were compared to select the coating conditions with lower time cost and higher P/N value as the optimal coating conditions. The results are shown in FIG. 3. FIG. 3 shows the effect of different coating temperatures and durations of time on inhibition rate and P/N value. From FIG. 3, it can be seen that coating at 4° C. for 16 hours provided the lowest negative PI and lower time cost, thus it was selected as the optimal coating condition.

4. Determination of Blocking Buffer

Figure 4:
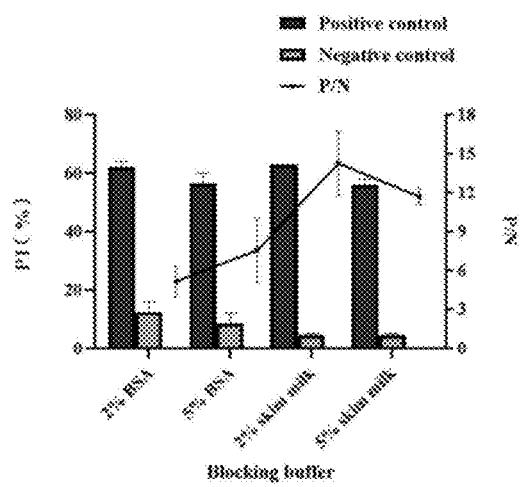
FIG. 4 shows an effect of different blocking buffers on inhibition rate and P/N value.

Except for a detection antigen concentration of 2 μg/mL, an enzyme-labeled antibody dilution of 1:32000, a serum dilution of 1:10, and a coating condition of 4° C. for 16 hours, the remaining experiment steps and parameters were the same as those in 2 Determination of serum dilution. Blocking buffers used were 2% BSA, 5% BSA, 2% skim milk, and 5% skim milk, and all other operations remained unchanged. The PI values and P/N values under each condition were compared, and the blocking buffer with the highest P/N value was selected as the optimal blocking buffer. The results are shown in FIG. 4. FIG. 4 shows the effect of different blocking buffers on the inhibition rate and P/N value. As shown in FIG. 4, using 2% skim milk as the blocking buffer resulted in the highest positive PI, the lowest negative PI, and the largest P/N value. Therefore, 2% skim milk was selected as the optimal blocking buffer.

5. Determination of Blocking Time

Figure 5:
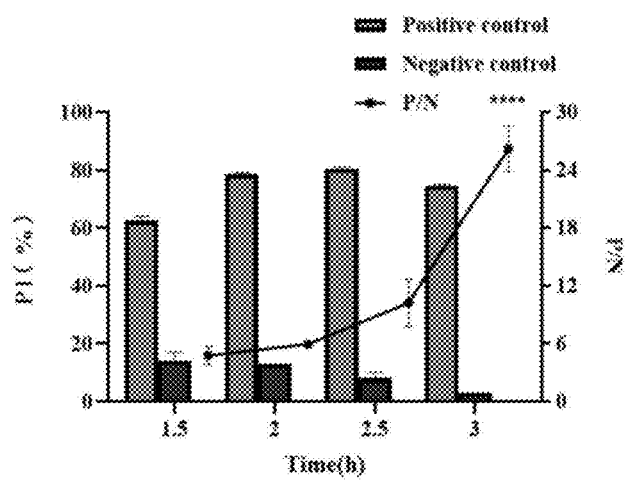
FIG. 5 shows an effect of different durations of blocking time on inhibition rate and P/N value.

Except for a detection antigen concentration of 2 μg/mL, an enzyme-labeled antibody dilution of 1:32,000, a serum dilution of 1:10, a coating condition of 4° C. for 16 h, and a blocking buffer of PBS containing 2% skim milk, the remaining experiment steps and parameters were the same as those in 2 Determination of serum dilution. Different blocking times were set to 2 hours, 2.5 hours, 3 hours, and 3.5 hours, respectively, while all other operations remained unchanged. The PI values and P/N values at each time point were calculated, and the time point with the highest P/N value was selected as the optimal blocking time. The results are shown in FIG. 5. FIG. 5 shows the effect of different durations of blocking time on the inhibition rate and P/N value. As shown in FIG. 5, blocking with 2% skim milk for 3 hours resulted in the highest P/N value. Therefore, 3 hours was selected as the optimal blocking time.

6. Determination of Incubation Time of Enzyme-Labeled Antibody

Figure 6:
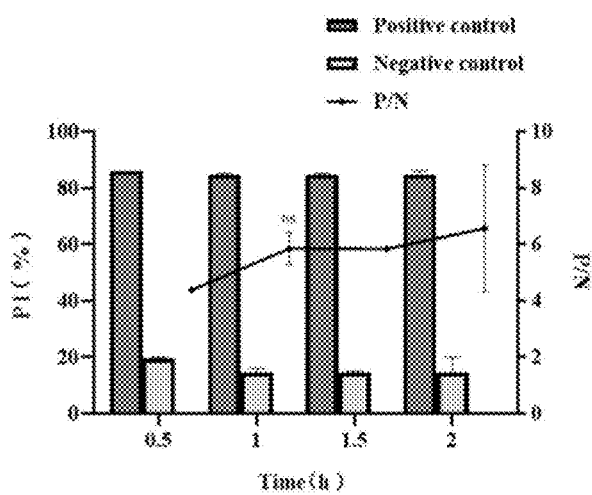
FIG. 6 shows an effect of different durations of incubation time of enzyme-labeled antibody on inhibition rate and P/N value.

Except for the optimal conditions determined from previous experiments (detection antigen concentration of 2 μg/mL, enzyme-labeled antibody dilution of 1:32000, serum dilution of 1:10, coating condition of 4° C. for 16 hours, blocking buffer of PBS containing 2% skim milk, and blocking time of 3 hours), the experiment was carried out following the steps in 2 Determination of serum dilution. Different incubation times for the enzyme-labeled antibody were set to 0.5 hours, 1.0 hours, 1.5 hours, and 2.0 hours, with all other operations unchanged. The PI values and P/N values at each time point were calculated, and the time point with the highest P/N value was selected as the optimal incubation time for the enzyme-labeled antibody. The results are shown in FIG. 6. FIG. 6 shows the effect of different durations of incubation time of the enzyme-labeled antibody on inhibition rate and P/N value. From FIG. 6, it can be seen that there was no significant difference in P/N values when incubated at 37° C. for 1.0, 1.5, and 2.0 h. Therefore, the shorter incubation time of 1.0 h was selected as the optimal incubation time.

7. Determination of Color Development Time

Figure 7:
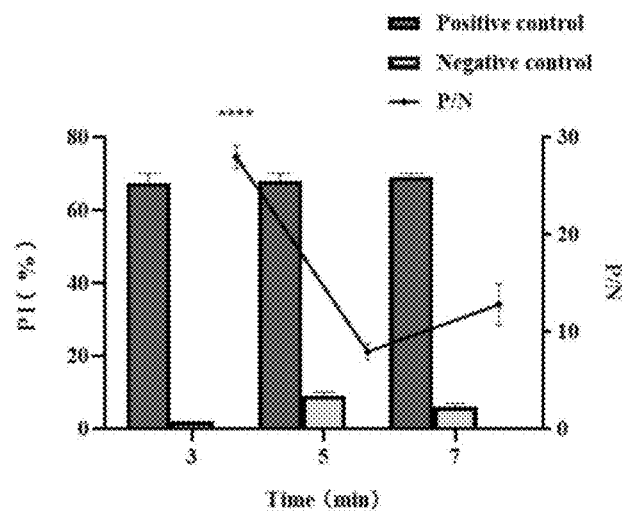
FIG. 7 shows an effect of different durations of color development time on inhibition rate and P/N value.

Except for the optimal conditions determined (antigen concentration of 2 μg/mL, enzyme-labeled antibody dilution of 1:32000, serum dilution of 1:10, coating condition of 4° C. for 16 hours, blocking buffer of PBS containing 2% skim milk, enzyme-labeled antibody incubation time of 1 hour), the experiment was carried out following the steps in 2 Determination of serum dilution. Different color development times were set to 5 minutes, 7 minutes, and 9 minutes, with all other operations unchanged. The PI values and P/N values at each time point were calculated, and the time point with the highest P/N value was selected as the optimal substrate reaction time. The results are shown in FIG. 7. FIG. 7 shows the effect of different durations of color development time on inhibition rate and P/N value. From FIG. 7, it can be seen that when incubated at 37° C. for 3 minutes, the P/N value was highest and the $OD_{450}$ nm value of the blank control was close to 1.0. Therefore, 3 minutes was selected as the optimal color development time.

Example 5: Determination of Threshold for ActA Monoclonal Antibody Competitive ELISA Detection Kit The ActA monoclonal antibody competitive ELISA detection kit included: one antigen-coated plate, 800 μL of positive control serum diluted 1:10, 800 μL of negative control serum diluted 1:10, 450 μL of enzyme-labeled antibody diluted 1:640, 30 mL of antibody dilution buffer (1×), 60 mL of PBST washing buffer (20×), 22 mL of substrate solution (TMB single-component substrate solution), 12 mL of stop solution (0.5-2 mol/L $H_2SO_4$), and one instruction manual.

Figure 8:
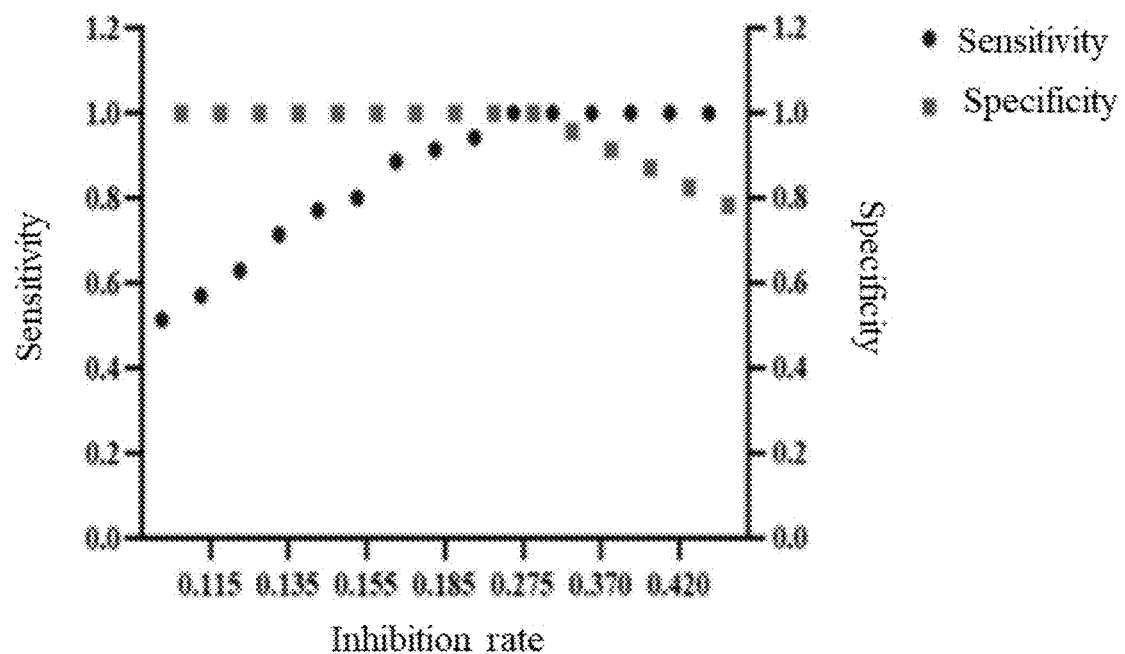
FIG. 8 shows specificity and sensitivity intersection of the competitive ELISA assay.
Figure 9:
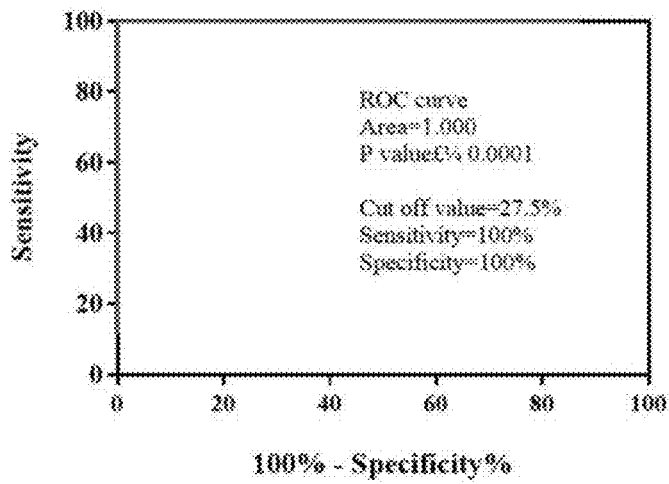
FIG. 9 shows an ROC analysis curve of the competitive ELISA assay.

Except for previously determined competitive ELISA reaction conditions (detection antigen concentration of 2 μg/mL, enzyme-labeled antibody dilution of 1:32000, serum dilution of 1:10, coating condition of 4° C. for 16 hours, blocking buffer of PBS containing 2% skim milk, and color development time of 3 minutes), the experiment in Example 5 was carried out following the operations in step 2 of Example 4. PI values for each of the 23 positive sheep sera and 35 negative sheep sera (sourced from a sheep farm in Jiangsu Province) were calculated. Data analysis was performed using SPSS Statistics 17.0 software, and a sensitivity and specificity intersection graph was plotted, as shown in FIG. 8. A receiver operating characteristic (ROC) curve was also plotted, using the largest Youden's index (Youden's index=sensitivity+specificity−1) to determine the Cut off value for the competitive ELISA, as shown in FIG. 9. FIG. 8 shows a sensitivity and specificity intersection graph for the competitive ELISA assay. As shown in FIG. 8, the trend of sensitivity and specificity varied with the inhibition rate. Specificity initially increased and then decreased with the inhibition rate, reaching a maximum at an inhibition rate of 0.275 (27.5%). Sensitivity consistently remained at 100%, and the intersection point of the two curves indicated the threshold value of the method, i.e., 0.275 (27.5%). FIG. 9 shows a ROC analysis curve of the competitive ELISA assay. The ROC curve and its associated metrics, including the area under the curve (represented by Area), P value (represented by P value$£^{1/4}$), the threshold (represented by Cut off value), sensitivity, and specificity, are shown. The diagonal line represents the reference line. The area under the ROC curve was tested, and the result showed an AUC of 1.000 with P<0.0001, indicating a statistically significant difference. Combining the Youden's index, as shown in Table 1, the inhibition rate corresponding to the maximum Youden's index was selected as the threshold for this method. When Youden's index was at its maximum, the optimal critical value for the competitive ELISA was 27.5%, with both sensitivity and specificity at 100%. This indicates that when the inhibition rate of a sample is greater than 27.5%, it is determined to be positive; otherwise, it is negative.

TABLE 1

Youden's index of selected sheep serum samples

| Cut-off | DSn | 1-DSp | Youden Index |
|---------|-------|-------|--------------|
| 13.5%   | 0.714 | 0     | 0.714        |
| 14.5%   | 0.771 | 0     | 0.771        |
| 15.5%   | 0.8   | 0     | 0.8          |
| 16.5%   | 0.886 | 0     | 0.886        |
| 18.5%   | 0.914 | 0     | 0.914        |
| 20.5%   | 0.943 | 0     | 0.943        |
| 27.5%   | 1     | 0     | 1            |
| 34.0%   | 1     | 0.043 | 0.957        |
| 37.0%   | 1     | 0.087 | 0.913        |
| 40.0%   | 1     | 0.13  | 0.87         |
| 42.0%   | 1     | 0.174 | 0.826        |
| 45.0%   | 1     | 0.217 | 0.783        |

Figure 10:
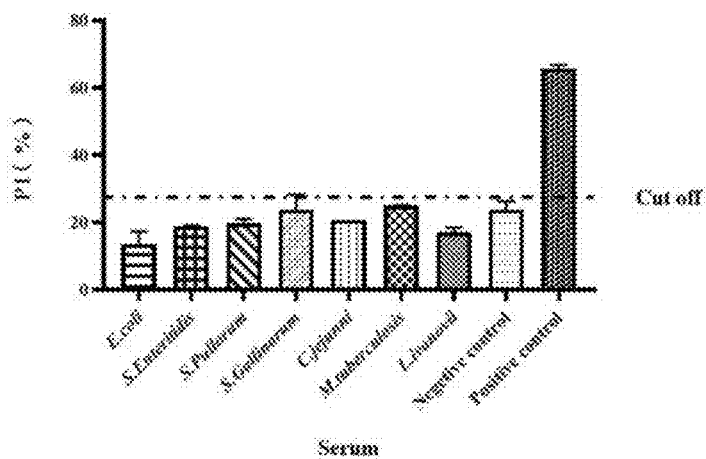
FIG. 10 shows specificity of the competitive ELISA assay.

Example 6: Specificity Test of ActA Monoclonal Antibody Competitive ELISA Detection Kit Using the competitive ELISA assay established in Example 5, positive sera from seven common pathogens, including *Escherichia coli* (*E. coli*), *Salmonella Enteritidis* (*S. Enteritidis*), *Salmonella Pullorum* (*S. Pullorum*), *Salmonella Gallinarum* (*S. Gallinarum*), *Campylobacter jejuni* (*C. jejuni*), *Mycobacterium tuberculosis* (*M. tuberculosis*), and *Listeria ivanovii* (*L. ivanovii*), were tested. Positive serum (Positive control) and negative serum (Negative control) controls were also set up. The PI values of all serum samples were calculated and compared to the Cut off value of the method in Example 5 to determine the presence of cross-reactivity. The results are shown in FIG. 10. FIG. 10 shows specificity of the competitive ELISA assay. As shown in FIG. 10, the competitive ELISA detection kit demonstrated good specificity with no cross-reactivity with positive sera from other common pathogens.

Example 7: Repeatability Test of ActA Monoclonal Antibody Competitive ELISA Detection Kit 1. Intra-Batch Repeatability Test For the intra-batch repeatability experiment, the competitive ELISA method established in Example 5 was used. The same batch of antigen-coated ELISA plates was used, and seven positive sheep serum samples and one negative sheep serum sample (sourced from a sheep farm in Jiangsu Province) were tested over three consecutive days. The experimental data were collected, and the coefficient of variation (CV) for each sample across the three experiments was analyzed. The results are shown in Table 2. The intra-batch coefficient of variation of the competitive ELISA method ranged from 2.55% to 6.80%.

TABLE 2

Intra-batch repeatability test results for the competitive ELISA

| Sample | Group 1 (M) | Group 2 (M) | Group 3 (M) | M | SD | CV |
|---|---|---|---|---|---|---|
| P1 | 0.357 | 0.397 | 0.411 | 0.388 | 0.023 | 5.85% |
| P2 | 0.442 | 0.48 | 0.519 | 0.48 | 0.031 | 6.54% |
| P3 | 0.521 | 0.545 | 0.583 | 0.55 | 0.026 | 4.64% |
| P4 | 0.452 | 0.472 | 0.491 | 0.472 | 0.016 | 3.35% |
| P5 | 0.371 | 0.427 | 0.433 | 0.41 | 0.028 | 6.80% |
| P6 | 0.064 | 0.07 | 0.074 | 0.069 | 0.004 | 5.93% |
| P7 | 0.07 | 0.079 | 0.075 | 0.075 | 0.004 | 4.93% |
| N1 | 1.096 | 1.142 | 1.211 | 1.15 | 0.047 | 4.11% |
| Blank | 1.173 | 1.167 | 1.108 | 1.149 | 0.029 | 2.55% |

Note: P: Positive Sample; N: Negative Sample

2. Inter-Batch Repeatability Test

For the inter-batch repeatability experiment, the competitive ELISA method established in Example 5 was used. Three batches of the antigen rHis-ActA were prepared. ELISA plates coated with different batches of the antigen were used to test 10 positive sheep serum samples and 2 negative sheep serum samples. The experimental data were collected and the coefficient of variation (CV) was analyzed. The results are shown in Table 3. The inter-batch coefficient of variation of the competitive ELISA method ranged from 1.22% to 14.44%, which is below 15%. These results indicate that the competitive ELISA detection kit has a low degree of variation and good inter-batch repeatability.

TABLE 3

Inter-batch repeatability test results for the competitive ELISA

| Sample | Group 1 (M) | Group 2 (M) | Group 3 (M) | M | SD | CV |
|---|---|---|---|---|---|---|
| P1 | 0.189 | 0.186 | 0.185 | 0.186 | 0.002 | 1.22% |
| P2 | 0.293 | 0.253 | 0.268 | 0.271 | 0.02 | 7.49% |
| P3 | 0.321 | 0.265 | 0.246 | 0.277 | 0.039 | 14.18% |
| P4 | 0.296 | 0.234 | 0.247 | 0.259 | 0.033 | 12.54% |
| P5 | 0.386 | 0.29 | 0.327 | 0.334 | 0.048 | 14.44% |
| P6 | 0.341 | 0.269 | 0.277 | 0.296 | 0.039 | 13.34% |
| P7 | 0.08 | 0.073 | 0.077 | 0.077 | 0.004 | 4.57% |
| P8 | 0.08 | 0.071 | 0.076 | 0.075 | 0.005 | 5.99% |
| P9 | 0.083 | 0.075 | 0.083 | 0.08 | 0.004 | 5.52% |
| P10 | 0.072 | 0.066 | 0.071 | 0.07 | 0.003 | 4.25% |
| N1 | 0.775 | 0.609 | 0.658 | 0.681 | 0.085 | 12.50% |
| N2 | 0.777 | 0.614 | 0.683 | 0.691 | 0.082 | 11.86% |
| Blank | 0.848 | 0.822 | 0.797 | 0.822 | 0.025 | 3.08% |

Note: P: Positive Samples; N: Negative Samples

3. Repeatability Test by Different Operators

Three different operators, Operator A, Operator B, and Operator C, used the competitive ELISA assay established in Example 5 to test 14 positive sheep serum samples and 10 negative sheep serum samples. The experimental data were collected and the CV was analyzed. The results are shown in Table 4. The coefficient of variation between different operators for the competitive ELISA method ranged from 1.0% to 9.7%. These results indicate that the competitive ELISA detection kit has a low degree of variation and good repeatability across different operators.

TABLE 4

Repeatability test results for the competitive ELISA by different operators

| Sample | Operator A | Operator B | Operator C | M | SD | CV |
|---|---|---|---|---|---|---|
| P1 | 0.177 | 0.2 | 0.215 | 0.197 | 0.016 | 7.9% |
| P2 | 0.225 | 0.247 | 0.261 | 0.244 | 0.015 | 6.1% |
| P3 | 0.356 | 0.356 | 0.414 | 0.375 | 0.027 | 7.3% |
| P4 | 0.249 | 0.292 | 0.294 | 0.278 | 0.021 | 7.5% |
| P5 | 0.257 | 0.282 | 0.316 | 0.285 | 0.024 | 8.5% |
| P6 | 0.274 | 0.294 | 0.264 | 0.277 | 0.012 | 4.5% |
| P7 | 0.321 | 0.382 | 0.388 | 0.364 | 0.030 | 8.3% |
| P8 | 0.237 | 0.269 | 0.301 | 0.269 | 0.026 | 9.7% |
| P9 | 0.172 | 0.203 | 0.206 | 0.194 | 0.015 | 7.9% |
| P10 | 0.214 | 0.208 | 0.218 | 0.213 | 0.004 | 1.9% |
| P11 | 0.074 | 0.077 | 0.086 | 0.079 | 0.005 | 6.5% |
| P12 | 0.062 | 0.062 | 0.069 | 0.064 | 0.003 | 5.1% |
| P13 | 0.073 | 0.077 | 0.081 | 0.077 | 0.003 | 4.2% |
| P14 | 0.075 | 0.08 | 0.081 | 0.079 | 0.003 | 3.3% |
| N1 | 0.743 | 0.736 | 0.767 | 0.749 | 0.013 | 1.8% |
| N2 | 0.666 | 0.646 | 0.654 | 0.655 | 0.008 | 1.3% |
| N3 | 0.724 | 0.701 | 0.77 | 0.732 | 0.029 | 3.9% |
| N4 | 0.776 | 0.73 | 0.725 | 0.744 | 0.023 | 3.1% |
| N5 | 0.821 | 0.774 | 0.81 | 0.802 | 0.020 | 2.5% |
| N6 | 0.763 | 0.706 | 0.789 | 0.753 | 0.035 | 4.6% |
| N7 | 0.747 | 0.73 | 0.742 | 0.740 | 0.007 | 1.0% |
| N8 | 0.737 | 0.712 | 0.729 | 0.726 | 0.010 | 1.4% |
| N9 | 0.726 | 0.717 | 0.802 | 0.748 | 0.038 | 5.1% |
| N10 | 0.619 | 0.616 | 0.587 | 0.607 | 0.014 | 2.4% |
| Blank | 0.934 | 0.873 | 1.05 | 0.952 | 0.073 | 7.7% |

Note: P: Positive Sample; N: Negative Sample

Figure 11:
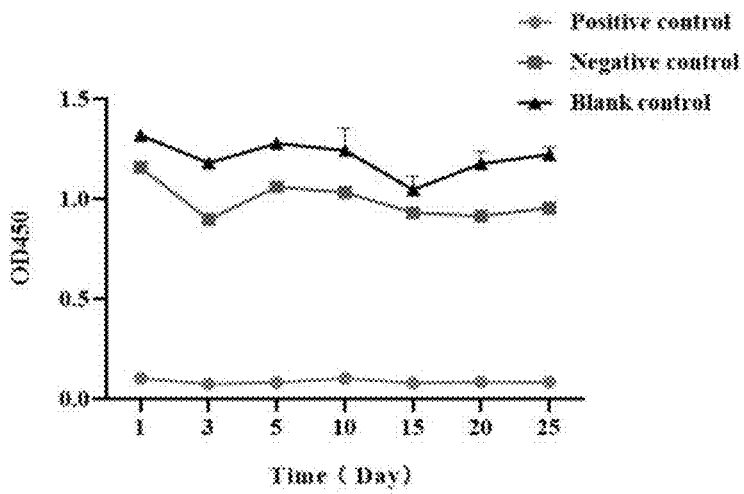
FIG. 11 shows an effect of different durations of storage time of the solid-phase carrier at 37° C. on detection results.

Example 8: Thermal Stability Test of ActA Monoclonal Antibody Competitive ELISA Detection Kit 1. Thermal Stability Test Results of Antigen-Coated Solid-Phase Carrier Using the competitive ELISA method established in Example 5, ELISA plates coated with the detection antigen were placed at 37° C. and tested on days 1, 2, 3, 5, 7, 10, 15, 20, and 25. The results are shown in FIG. 11. FIG. 11 shows the effect of different durations of storage time of the solid-phase carrier at 37° C. on detection results. As shown in FIG. 11, the CV for the positive, negative, and blank controls was less than 10%, indicating that the antigen-coated solid-phase carrier had good thermal stability.

2. Thermal Stability Test Results of Enzyme-Labeled Antibody

Figure 12:
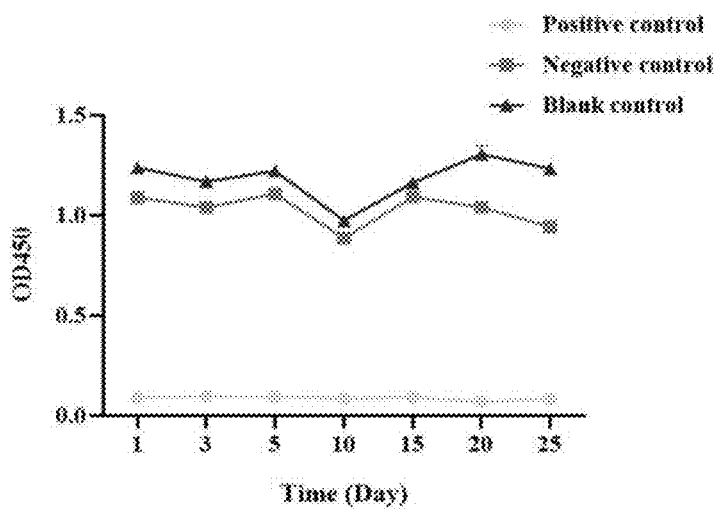
FIG. 12 shows an effect of different durations of storage time of enzyme-labeled antibody at 37° C. on detection results.

Using the competitive ELISA method established in Example 5, the enzyme-labeled antibody was diluted with Candor's HRP-Protector™ at a dilution ratio of 50:1. The diluted enzyme-labeled antibody was placed at 37° C. for accelerated degradation and tested on days 1, 3, 5, 7, 10, 15, 20, and 25. The results are shown in FIG. 12. FIG. 12 shows the effect of different durations of storage time of enzyme-labeled antibody at 37° C. on detection results. As shown in FIG. 12, the CV for the positive, negative, and blank controls was less than 5%, indicating that the enzyme-labeled antibody had good thermal stability.

3. Thermal Stability Test Results of Negative Control and Positive Control

Figure 13:
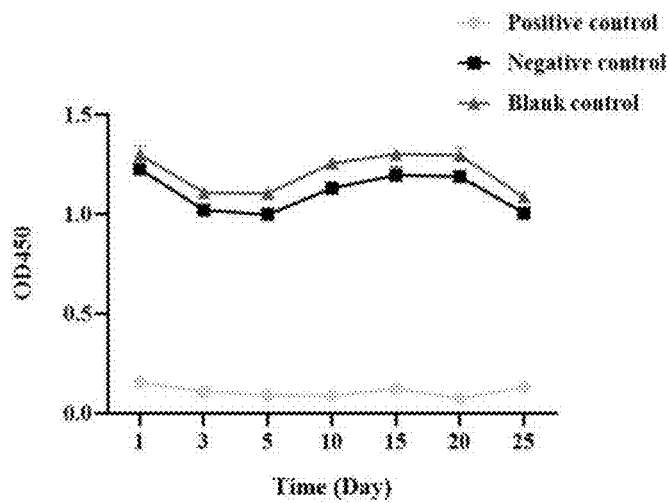
FIG. 13 shows an effect of different durations of storage time of control sera at 37° C. on detection results.

Using the competitive ELISA method established in Example 5, negative sheep serum and positive sheep serum were diluted with 1% BSA-PBS solution and Candor's enzyme-labeled antibody stabilizer HRP-Protector™ at a dilution ratio of 17:1:2. The diluted negative and positive sera were placed at 37° C. for accelerated degradation and tested on days 1, 3, 5, 7, 10, 15, 20, and 25. The results are shown in FIG. 13. FIG. 13 shows the effect of different durations of storage time of control sera at 37° C. on detection results. As shown in FIG. 13, the CV for the negative control, positive control, and blank control was less than 5%, indicating that the negative and positive controls had good thermal stability.

Example 9: Application Test I of ActA Monoclonal Antibody Competitive ELISA Detection Kit The competitive ELISA detection kit described in the present invention was used to test a total of 928 sheep serum samples collected from a Chinese sheep farm. The results showed that antibodies were positive in 205 sheep serum samples and negative in 723 sheep serum samples, with a positive rate of 22.10% for ActA antibodies. This suggests a high infection rate of Listeria monocytogenes in the sheep farm, indicating that preventive and control measures should be implemented.

Example 10: Application Test II of Listeriosis Competitive ELISA Detection Kit

The competitive ELISA detection kit described in the present invention was used to test a total of 306 human serum samples collected from Jiangsu Province (sourced from a local center for disease control and prevention in Jiangsu). The results showed that all 306 serum samples were negative for ActA antibodies.

Example 11: Conformity Test of ActA Monoclonal Antibody Competitive ELISA Detection Kit The competitive ELISA detection kit described in the present invention was used to test a total of 47 sheep serum samples, of which 25 were positive and 22 were negative. The test results are shown in Table 5. A total of 45 samples had consistent test results, with an overall conformity rate of 95.7%.

TABLE 5

Conformity results of the competitive ELISA detection kit

| | Diatheva detection kit | | |
|---|---|---|---|
| | Positive | Negative | Total |
| Negative result for the kit of the present invention | 23 | 2 | 25 |
| Positive result for the kit of the present invention | 0 | 22 | 22 |
| Total | 23 | 24 | 47 |

Example 12: Preparation of Immunomagnetic Beads

First, 200 µL of carboxylated magnetic beads were washed three times with 500 µL of 0.01 mol/L, pH 6.0 MES-Tween (MEST) solution, and the supernatant was discarded after using a magnetic separator. The beads were resuspended in the MEST solution to obtain a magnetic bead suspension. The activation reagent, which is a MEST solution containing 5 mg/mL of carbodiimide (EDC) and 5 mg/mL of N-hydroxysuccinimide (NHS), was slowly added to the magnetic bead suspension, and the mixture was shaken at 37° C. for 1 hour to obtain activated carboxyl magnetic beads. Then, the ActA monoclonal antibody 3G11 from Example 2 was mixed with the activated carboxyl magnetic beads, and the total volume was adjusted to 500 µL using the MEST coupling buffer. The mixture was shaken on a mixing instrument and incubated at 37° C. for 4 hours to obtain immunomagnetic beads. 1 mL of PBST (pH 7.4, 2% BSA) buffer was added for blocking, and incubation was performed at 37° C. for 2 hours. Finally, the supernatant was discarded after using magnetic separation, and the beads were washed three times with PBST, then resuspended in PBST (pH 7.4, 0.02% $NaN_3$, 0.5% BSA) storage solution, and stored at 4° C.

Example 13: Optimization of Antibody Coupling Time

Equal amounts of activated carboxyl magnetic beads (200 µL each), obtained from Example 12, were taken. 100 µg of ActA monoclonal antibody 3G11 was added to each group of activated carboxyl magnetic beads, and the total volume was adjusted to 500 µL using MEST coupling buffer. The reactions were carried out at 37° C. for 3 hours, 4 hours, and 5 hours, respectively, with three parallels for each group, that is, nine groups of immunomagnetic beads in total. Each of the nine groups of immunomagnetic beads was added to Listeria monocytogenes bacterial solution at a concentration of $10^3$ CFU/mL and a volume of 1 mL, and incubated at 37° C. for 1 hour. The beads were washed three times with a sterile PBS solution, followed by magnetic separation on a magnetic stand. The supernatant was discarded, and the immunomagnetic beads were resuspended in 100 µL of sterile PBS solution and then spread on BHI agar plates. The capture efficiency of the immunomagnetic beads was calculated based on the results obtained from plate counting, determining the optimal antibody coupling time. The capture efficiency (CE) was calculated using formula (1):

$$CE(\%) = (1 - C_u/C_0) \times 100, \qquad (1)$$

where C0 is the number of colonies before capture, and Cu is the number of colonies in the supernatant after capture.

Figure 14:
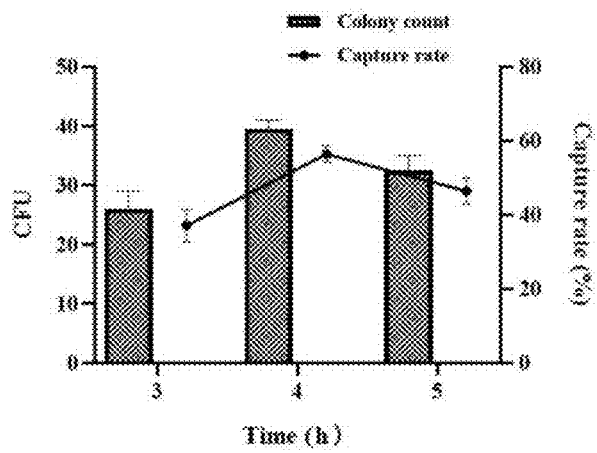
FIG. 14 shows an effect of different durations of coupling time of the antibody on capture efficiency.

The results are shown in FIG. 14. FIG. 14 shows the effect of different durations of coupling time of the antibody on capture efficiency, where Colony count represents the number of captured bacteria, and Capture rate represents the capture efficiency. As shown in FIG. 14, as the coupling time of ActA monoclonal antibody 3G11 increased from 3 hours to 4 hours, the number of captured bacteria and the capture efficiency of the immunomagnetic beads also increased. At 4 hours, the number of captured bacteria and the capture efficiency reached their peak. After the coupling time exceeded 4 hours, both the number of captured bacteria and the capture efficiency gradually decreased. Considering the bioactivity of the antibody and time cost, 4 hours was selected as the optimal antibody coupling time for ActA monoclonal antibody 3G11.

Example 14: Optimization of Antibody Coupling Amount

Equal amounts of activated carboxyl magnetic beads (200 μL each) obtained from Example 12 were taken, into which 50 μg, 100 μg, 150 μg, and 200 μg of ActA monoclonal antibody 3G11 were added respectively. The total volume of each group was adjusted to 500 μL using MEST coupling buffer and incubation was performed at 37° C. for 4 hours. Each group of activated carboxyl magnetic beads was set up with three parallels, that is, 12 groups of immunomagnetic beads in total. Each of the 12 groups of immunomagnetic beads was added to *Listeria monocytogenes* bacterial solution at a concentration of $10^3$ CFU/mL and a volume of 1 mL, and incubated at 37° C. for 1 hour. The beads were washed three times with a sterile PBS solution, followed by magnetic separation on a magnetic stand. The supernatant was removed, and the immunomagnetic beads were resuspended in 100 μL of sterile PBS solution and then spread on BHI agar plates. The capture efficiency of the immunomagnetic beads was calculated based on the results obtained from plate counting, determining the optimal antibody coupling amount, using the aforementioned formula (1).

Figure 15:
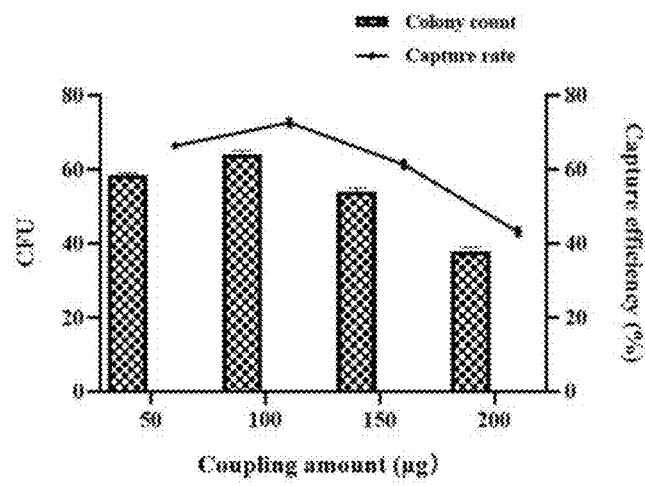
FIG. 15 shows an effect of different antibody amounts on capture efficiency.

The results are shown in FIG. 15. FIG. 15 shows the effect of different antibody amounts on capture efficiency, where Colony count represents the number of captured bacteria, and Capture rate represents the capture efficiency. As shown in FIG. 15, when the amount of ActA monoclonal antibody 3G11 added was between 50-100 μg, the number of captured bacteria and the capture efficiency increased with the amount of added antibody. When the amount of ActA monoclonal antibody 3G11 added was between 100-200 μg, the number of captured bacteria and the capture efficiency gradually decreased with the amount of added antibody. To ensure the maximum immune response between the antibody and the target antigen without excessive antibody consumption, 100 μg was selected as the optimal coupling amount for ActA monoclonal antibody 3G11.

Example 15: Optimization of Bacterial Solution Enrichment Time

The *Listeria monocytogenes* bacterial solution was diluted to a concentration of $10^3$ CFU/mL (with volume of 1 mL). 200 μL of immunomagnetic beads obtained from Example 12 were added and incubated at 37° C. for 15 minutes, 30 minutes, 60 minutes, and 90 minutes, respectively. Each group was set up with three parallels, that is, 12 experiment samples in total. The beads were washed three times with a sterile PBS solution, followed by magnetic separation on a magnetic stand. The supernatant was removed, and the immunomagnetic beads were resuspended in 100 μL of sterile PBS solution and then spread on BHI agar plates. The capture efficiency of the immunomagnetic beads was calculated based on the results obtained from plate counting, determining the optimal bacterial solution enrichment time, using the aforementioned formula (1).

Figure 16:
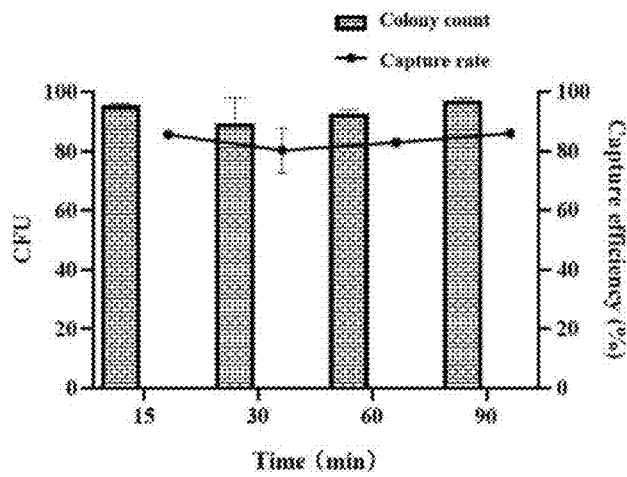
FIG. 16 shows an effect of different durations of enrichment time of bacterial solution on capture efficiency.

The results are shown in FIG. 16. FIG. 16 shows the effect of different durations of enrichment time of bacterial solution on capture efficiency, where Colony count represents the number of captured bacteria, and Capture rate represents the capture efficiency. As shown in FIG. 16, the capture efficiency of the immunomagnetic beads for *Listeria monocytogenes* was relatively highest at an enrichment time of 15 minutes. The capture efficiency decreased slowly and nearly remained unchanged between 15 minutes and 90 minutes. Since the present invention aims to develop a rapid and efficient detection method, 15 minutes was selected as the optimal enrichment time for the immunomagnetic beads and bacterial solution.

Example 16: Specificity Test for Separation of *Listeria monocytogenes* Using Immunomagnetic Beads 200 μL of immunomagnetic beads obtained from Example 12 were added to a mixture of *Listeria monocytogenes* solution, *Staphylococcus aureus* solution, *Salmonella typhimurium* solution, *Escherichia coli* solution, and *Vibrio parahaemolyticus* solution. Each bacterial solution had a concentration of $10^3$ CFU/mL and a volume of 0.2 mL, making the total volume of the mixture 1 mL. After shaking incubation at 37° C. for 15 minutes, the supernatant was discarded, and the beads were washed three times with sterile PBS solution. The immunomagnetic beads were resuspended in 100 μL of sterile PBS solution and plated on *Listeria* chromogenic medium. The plate was incubated at 37° C. for 18-24 hours to observe colony growth. The results are shown in Table 6.

TABLE 6

Specificity of immunomagnetic beads

| Bacterial solution | IMBS-Chromogenic/ Fluorogenic Culture Media |
|---|---|
| *Staphylococcus aureus* | − |
| *Salmonella typhimurium* | − |
| *Escherichia coli* | − |
| *Vibrio parahaemolyticus* | − |
| *Listeria monocytogenes* | + |

Note:
+: colony growth on chromogenic medium after immunomagnetic bead separation (Positive reaction);
−: no colony growth on chromogenic medium after immunomagnetic bead separation (Negative reaction)

As shown in Table 6, only *Listeria monocytogenes* grew on the *Listeria* chromogenic medium when the immunomagnetic beads prepared under optimal conditions were added to the mixture of the five different genera of bacteria. Other bacteria did not grow, indicating that the immunomagnetic beads specifically captured *Listeria monocytogenes* and that this method had high specificity for *Listeria monocytogenes*.

Example 17: Sensitivity Test for Separation of *Listeria monocytogenes* Using Immunomagnetic Beads

*Listeria monocytogenes* solution was diluted to concentrations of $1\times10^5$ CFU/mL, $1\times10^4$ CFU/mL, $1\times10^3$ CFU/mL, $1\times10^2$ CFU/mL, and $1\times10^1$ CFU/mL. 1 mL of each diluted solution was added in a 1.5 mL centrifuge tube. 200 μL of immunomagnetic beads obtained from Example 12 were added to each centrifuge tube. After shaking incubation at 37° C. for 15 minutes, the supernatant was discarded, and the beads were washed three times with sterile PBS solution. The immunomagnetic beads were resuspended in 100 μL of sterile PBS solution and plated on *Listeria* chromogenic medium. The plate was incubated at 37° C. for 18-24 h to observe colony growth. The IMBS-*Listeria* chromogenic medium was used for the detection of *Listeria monocytogenes* in the concentration range of $10^1$-$10^5$ CFU/mL. The results are shown in Table 7.

TABLE 7

Sensitivity of immunomagnetic beads

| *Listeria monocytogenes* solution concentration (CFU/mL) | IMBS-Chromogenic/ Fluorogenic Culture Media |
| --- | --- |
| $10^5$ | + |
| $10^4$ | + |
| $10^3$ | + |
| $10^2$ | +/− |
| $10^1$ | − |

Note:
+: growth of *Listeria monocytogenes* on *Listeria* chromogenic medium after immunomagnetic bead separation (Positive reaction);
−: no growth of *Listeria monocytogenes* on *Listeria* chromogenic medium after immunomagnetic bead separation (Negative reaction).

As shown in Table 7, the detection method of the present invention was able to detect *Listeria monocytogenes* at concentrations of no less than $10^3$ CFU/mL. *Listeria monocytogenes* at concentrations less than $10^2$ CFU/mL could not be accurately detected, indicating that the detection limit of this method in the liquid phase is $10^2$-$10^3$ CFU/mL.

Example 18: Capturing *Listeria monocytogenes* from Actual Samples Using Immunomagnetic Beads Twenty commercially available chicken meat samples were tested using the established immunomagnetic bead method. Each sample was washed with 25 mL of sterile PBS solution. 12.5 mL of collected PBS solution that washed the samples was used directly for enrichment with immunomagnetic beads obtained from Example 12. After magnetic separation, the beads were washed three times with a sterile PBS solution. The immunomagnetic beads were resuspended in 100 μL of sterile PBS solution, plated on a chromogenic medium, and incubated at 37° C. for 18-24 h to observe colony growth. The results were compared with those obtained using traditional microbial culture methods (where the remaining 12.5 mL of PBS solution that washed the chicken meat samples was added to BPW, and *Listeria monocytogenes* was isolated and identified according to traditional microbial culture methods). The coincidence rate was calculated as follows: (the samples that were positive by both methods+the samples that were negative by both methods)/the total number of samples×100%, to evaluate the practical application value of the method. The results are shown in Table 8.

TABLE 8

Test results of coincidence rate between the immunomagnetic bead and traditional microbial culture method

| | Traditional microbial culture method | | |
| --- | --- | --- | --- |
| | Positive | Negative | Total |
| IMBS-Positive | 7 | 0 | 7 |
| IMBS-Negative | 1 | 12 | 13 |
| Total | 8 | 12 | 20 |

As shown in Table 8, the immunomagnetic bead method detected 7 positive samples and 13 negative samples out of the 20 chicken meat samples tested, with a sample positivity rate of 35.0%. The traditional microbial culture method detected 8 positive samples and 12 negative samples, with a positivity detection rate of 40.0%. The coincidence rate between the immunomagnetic bead method and the traditional microbial culture method was 95.0%, indicating that the immunomagnetic bead method has good concordance and is suitable for clinical detection.

The present invention utilizes immunomagnetic bead (IMBS) technology combined with *Listeria* chromogenic medium. Specifically, a specific monoclonal antibody 3G11 against the surface protein ActA of *Listeria monocytogenes* is selected and coupled to carboxylated magnetic beads. Through specific binding with the ActA antigen of *Listeria* in the sample, the purpose of enriching *Listeria* is achieved. Compared to conventional *Listeria monocytogenes* detection techniques, the above-mentioned examples demonstrate specificity, efficiency, and stability in detecting *Listeria monocytogenes*. The ActA monoclonal antibody 3G11 can specifically couple with carboxylated magnetic beads, directly targeting the antigen without the need for pre-enrichment, reducing false positives and increasing accuracy. The present invention fully combines the advantages of immunomagnetic bead technology and *Listeria* chromogenic medium, utilizing the high enrichment characteristics of IMBS technology to separate *Listeria monocytogenes* from the sample, and then using *Listeria* chromogenic medium for identification. This method has high specificity and can detect *Listeria monocytogenes* in about 20 h, which saves over 40 hours compared to the traditional national standard method, thus developing a rapid detection method for *Listeria monocytogenes*. Additionally, the method is simple to operate and does not require large instruments or specially trained personnel, making it suitable for a wide range of applications and potentially serving as technical support for health epidemic prevention and health supervision.

Sequence Listing

<110> Yangzhou University
<120> Hybridoma cell line secreting an ActA monoclonal antibody and use thereof
<160> 10
<170> SIPOSequenceListing 1.0

Sequence Listing

```
<210> 1
<211> 16
<212> PRT
<213> Artificial Sequence
<400> 1
Arg Ser Ser Gln Ser Leu Val His Ser Asn Gly Asn Thr Tyr Leu His
1               5                   10                  15

<210> 2
<211> 7
<212> PRT
<213> Artificial Sequence
<400> 2
Arg Val Ser Asn Arg Phe Ser
1               5

<210> 3
<211> 9
<212> PRT
<213> Artificial Sequence
<400> 3
Ser Gln Ser Thr His Val Pro Tyr Thr
1               5

<210> 4
<211> 5
<212> PRT
<213> Artificial Sequence
<400> 4
Asn Tyr Trp Ile Gly
1               5

<210> 5
<211> 17
<212> PRT
<213> Artificial Sequence
<400> 5
Asp Ile Tyr Pro Gly Thr Gly Tyr Thr Asn Tyr Asn Glu Lys Phe Lys
1               5                   10                  15
Gly <210> 6
<211> 4
<212> PRT
<213> Artificial Sequence
<400> 6
Asp Leu Asp Tyr
1

<210> 7
<211> 131
<212> PRT
<213> Artificial Sequence
<400> 7
Met Lys Leu Pro Val Arg Leu Leu Val Leu Met Phe Trp Ile Pro Ala
1               5                   10                  15
Ser Ser Ser Asp Val Val Met Thr Gln Thr Pro Leu Ser Leu Pro Val
                20                  25                  30
Ser Leu Gly Asn Gln Ala Ser Ile Ser Cys Arg Ser Ser Gln Ser Leu
            35                  40                  45
Val His Ser Asn Gly Asn Thr Tyr Leu His Trp Tyr Leu Gln Lys Pro
50                  55                  60
Gly Gln Ser Pro Lys Leu Leu Ile Tyr Arg Val Ser Asn Arg Phe Ser
65                  70                  75                  80
Gly Val Pro Asp Arg Phe Ser Gly Ser Gly Ser Gly Thr Asp Phe Thr
                85                  90                  95
Leu Lys Ile Ser Arg Val Glu Ala Glu Asp Leu Gly Val Tyr Phe Cys
            100                 105                 110
Ser Gln Ser Thr His Val Pro Tyr Thr Phe Gly Gly Gly Thr Lys Leu
        115                 120                 125
Glu Ile Lys
    130

<210> 8
<211> 393
<212> DNA
<213> Artificial sequence
```

Sequence Listing

```
<400> 8
atgaagttgc ctgttaggct gttggtgctg atgttctgga ttcctgcttc cagcagtgat   60
gttgtgatga cccaaactcc actctccctg cctgtcagtc ttggaaatca agcctccatc  120
tcttgcagat ctagtcagag ccttgtacac agtaatggaa acacctattt acattggtac  180
ctgcagaagc caggccagtc tccaaagctc ctgatctaca gagttccaac cgatttctct  240
ggggtcccag acaggttcag tggcagtgga tcagggacag atttcacact caagatcagc  300
agagtggagg ctgaggatct gggagtttat ttctgctctc aaagtacaca tgttccgtac  360
acgttcggag gggggaccaa gctggaaata aaa                                393

<210> 9
<211> 132
<212> PRT
<213> Artificial Sequence
<400> 9
Met Glu Trp Ser Gly Val Phe Ile Phe Leu Leu Ser Val Thr Ala Gly
 1               5                  10                  15
Val His Ser Gln Val Gln Leu Gln Gln Ser Gly Ala Asp Leu Val Arg
                20                  25                  30
Pro Gly Thr Ser Val Lys Met Ser Cys Lys Ala Ala Gly Tyr Thr Phe
            35                  40                  45
Thr Asn Tyr Trp Ile Gly Trp Val Lys Gln Arg Pro Gly His Gly Leu
        50                  55                  60
Glu Trp Ile Gly Asp Ile Tyr Pro Gly Thr Gly Tyr Thr Asn Tyr Asn
65                  70                  72                  80
Glu Lys Phe Lys Gly Lys Ala Thr Leu Thr Ala Asp Thr Ser Ser Ser
                85                  90                  95
Thr Ala Tyr Met Gln Leu Ser Ser Leu Thr Ser Glu Asp Ser Ala Ile
            100                 105                 110
Tyr Tyr Cys Ala Arg Asp Leu Asp Tyr Trp Gly Gln Gly Thr Ser Val
        115                 120                 125
Thr Val Ser Ser
    130

<210> 10
<211> 396
<212> DNA
<213> Artificial Sequence
<400> 10
atggaatgga gcggggtctt tatctttctc ctgtcagtaa ctgcaggtgt ccactcccag   60
gtccagctgc agcagtctgg agctgacctg gtaaggcctg gacttcagt gaagatgtcc   120
tgcaaggctg cggatacac cttcactaac tactggatag gttgggtaaa gcagaggcct  180
ggacatggcc ttgagtggat tggagatatt tatcctggaa ctggttatac taactacaat  240
gagaagttca aggcaaggc cacactgact gcagacacat cctccagcac agcctacatg  300
cagctcagca gcctgacatc tgaggactct gccatctatt actgtgcaag agacttggac  360
tactggggtc aaggaacctc agtcaccgtc tcctca                             396
```

SEQUENCE LISTING

Sequence total quantity: 10

SEQ ID NO: 1            moltype = AA  length = 16
FEATURE                 Location/Qualifiers
source                  1..16
                        mol_type = protein
                        organism = synthetic construct
SEQUENCE: 1
RSSQSLVHSN GNTYLH                                                    16

SEQ ID NO: 2            moltype = AA  length = 7
FEATURE                 Location/Qualifiers
source                  1..7
                        mol_type = protein
                        organism = synthetic construct
SEQUENCE: 2
RVSNRFS                                                               7

SEQ ID NO: 3            moltype = AA  length = 9
FEATURE                 Location/Qualifiers
source                  1..9
                        mol_type = protein
                        organism = synthetic construct
SEQUENCE: 3
SQSTHVPYT                                                             9

```
SEQ ID NO: 4              moltype = AA   length = 5
FEATURE                   Location/Qualifiers
source                    1..5
                          mol_type = protein
                          organism = synthetic construct
SEQUENCE: 4
NYWIG                                                                  5

SEQ ID NO: 5              moltype = AA   length = 17
FEATURE                   Location/Qualifiers
source                    1..17
                          mol_type = protein
                          organism = synthetic construct
SEQUENCE: 5
DIYPGTGYTN YNEKFKG                                                    17

SEQ ID NO: 6              moltype = AA   length = 4
FEATURE                   Location/Qualifiers
source                    1..4
                          mol_type = protein
                          organism = synthetic construct
SEQUENCE: 6
DLDY                                                                   4

SEQ ID NO: 7              moltype = AA   length = 131
FEATURE                   Location/Qualifiers
source                    1..131
                          mol_type = protein
                          organism = synthetic construct
SEQUENCE: 7
MKLPVRLLVL MFWIPASSSD VVMTQTPLSL PVSLGNQASI SCRSSQSLVH SNGNTYLHWY     60
LQKPGQSPKL LIYRVSNRFS GVPDRFSGSG SGTDFTLKIS RVEAEDLGVY FCSQSTHVPY    120
TFGGGTKLEI K                                                         131

SEQ ID NO: 8              moltype = DNA   length = 393
FEATURE                   Location/Qualifiers
source                    1..393
                          mol_type = other DNA
                          organism = synthetic construct
SEQUENCE: 8
atgaagttgc ctgttaggct gttggtgctg atgttctgga ttcctgcttc cagcagtgat     60
gttgtgatga cccaaactcc actctccctg cctgtcagtc ttggaaatca agcctccatc    120
tcttgcagat ctagtcagag ccttgtacac agtaatgaac acacctattt acattggtac    180
ctgcagaagc caggccagtc tccaaagctc ctgatctaca gagtttccaa ccgatttcct    240
ggggtcccag acaggttcag tggcagtgga tcagggacag atttcacact caagatcagc    300
agagtggagg ctgaggatct gggagtttat ttctgctctc aaagtacaca tgttccgtac    360
acgttcggag gggggaccaa gctggaaata aaa                                 393

SEQ ID NO: 9              moltype = AA   length = 132
FEATURE                   Location/Qualifiers
source                    1..132
                          mol_type = protein
                          organism = synthetic construct
SEQUENCE: 9
MEWSGVFIFL LSVTAGVHSQ VQLQQSGADL VRPGTSVKMS CKAAGYTFTN YWIGWVKQRP     60
GHGLEWIGDI YPGTGYTNYN EKFKGKATLT ADTSSSTAYM QLSSLTSEDS AIYYCARDLD    120
YWGQGTSVTV SS                                                        132

SEQ ID NO: 10             moltype = DNA   length = 396
FEATURE                   Location/Qualifiers
source                    1..396
                          mol_type = other DNA
                          organism = synthetic construct
SEQUENCE: 10
atggaatgga gcgggtctt tatctttctc ctgtcagtaa ctgcaggtgt ccactcccag      60
gtccagctgc agcagtctgg agctgacctg gtaaggcctg ggacttcagt gaagatgtcc    120
tgcaaggctt cgggatacac cttcactaac tactggatag ttgggtaaa gcagaggcct     180
ggacatggcc ttgagtggat tggagatatt tatcctggaa ctggttatac taactacaat    240
gagaagttca agggcaaggc cacactgact gcagacacat cctccagcac agcctacatg    300
cagctcagca gcctgacatc tgaggactct gccatctatt actgtgcaag agacttggac    360
tactggggtc aaggaacctc agtcaccgtc tcctca                              396
```

The invention claimed is:

1. A competitive ELISA detection kit for detecting *Listeria monocytogenes* infection, comprising an Actin assembly-inducing protein (ActA) monoclonal antibody or a polynucleotide; wherein the ActA monoclonal antibody comprises a heavy chain and a light chain, wherein the light chain comprises three complementarity determining regions with amino acid sequences shown as SEQ ID NO:1, SEQ ID NO:2, and SEQ ID NO:3, respectively; and the heavy chain comprises three complementarity determining regions with amino acid sequences shown as SEQ ID NO:4, SEQ ID NO:5, and SEQ ID NO:6, respectively;

wherein the polynucleotide encodes the ActA monoclonal antibody, wherein a nucleotide sequence encoding the light chain of the ActA monoclonal antibody is shown as SEQ ID NO: 8, and a nucleotide sequence encoding the heavy chain of the ActA monoclonal antibody is shown as SEQ ID NO: 10;

wherein the competitive ELISA detection kit further comprises one or more of the following: an enzyme-labeled antibody, a coated antigen, a positive and/or negative control serum for *Listeria monocytogenes*, a coating buffer, a blocking buffer, a dilution buffer, a washing buffer, a substrate solution, and a reaction stop solution.

2. The competitive ELISA detection kit of claim 1, wherein the enzyme-labeled antibody is obtained by labeling the ActA monoclonal antibody against *Listeria monocytogenes* with horseradish peroxidase;

wherein the enzyme-labeled antibody is diluted at a ratio of 1:32000, the coated antigen is rHis-ActA protein, a concentration of the coated antigen is 2.0 µg/mL, the positive and/or negative control serum for *Listeria monocytogenes* is diluted at ratios of 1:8, 1:10, 1:12, 1:16, or 1:20, the coating buffer is carbonate buffer with a pH of 9.6, the blocking buffer is a PBS solution containing 2% to 5% skim milk, the dilution buffer is a PBS solution containing 1-2% BSA, the washing buffer is a PBST solution with a pH of 7.2, the substrate solution is TMB single-component substrate solution, and the reaction stop solution is 0.5-2 mol/L $H_2SO_4$.

3. The competitive ELISA detection kit of claim 2, wherein the competitive ELISA detection kit comprises 800 µL of positive control serum for *Listeria monocytogenes*, 800 µL of negative control serum for *Listeria monocytogenes*, 450 µL of enzyme-labeled antibody diluted 1:640, 30 mL of antibody dilution buffer (1×), 60 mL of PBST washing buffer (20×), 22 mL of TMB single-component substrate solution, and 12 mL of stop solution.

4. The competitive ELISA detection kit of claim 1, wherein the coating antigen is coated at 4° C. for 16 hours, a blocking time is 3 hours, an incubation time for the enzyme-labeled antibody is 1 hour, and a color development time is 3 minutes.

5. The competitive ELISA detection kit of claim 1, wherein a critical value for the competitive ELISA kit is 27.5%.

* * * * *